(12) United States Patent
Passarelli, Jr. et al.

(10) Patent No.: US 7,589,666 B2
(45) Date of Patent: Sep. 15, 2009

(54) SYSTEM AND METHOD FOR PROCESSING DATA IN WEATHER RADAR

(75) Inventors: Richard E. Passarelli, Jr., Groton, MA (US); Alan D. Siggia, Acton, MA (US)

(73) Assignee: Vaisala, Inc., Westford, MA (US)

( * ) Notice: Subject to any disclaimer, the term of this patent is extended or adjusted under 35 U.S.C. 154(b) by 231 days.

(21) Appl. No.: 11/322,524

(22) Filed: Dec. 30, 2005

(65) Prior Publication Data

US 2008/0001808 A1 Jan. 3, 2008

Related U.S. Application Data

(60) Provisional application No. 60/640,713, filed on Dec. 30, 2004.

(51) Int. Cl.
G01S 7/486 (2006.01)
G01S 7/493 (2006.01)
G01S 13/95 (2006.01)
G01S 13/00 (2006.01)

(52) U.S. Cl. ................. 342/196; 342/26 R; 342/89; 342/159; 342/175; 342/192; 342/194; 342/195

(58) Field of Classification Search ...... 342/26 R–26 D, 342/82–103, 159–164, 175, 192–197, 176, 342/179
See application file for complete search history.

(56) References Cited

U.S. PATENT DOCUMENTS 3,610,901 A * 10/1971 Lynch ................ 342/196

4,589,070 A 5/1986 Kyrazis (Continued)

FOREIGN PATENT DOCUMENTS

DE 197 49 397 A 1 5/1998

(Continued)

OTHER PUBLICATIONS

A.D. Siggia et al., "Gaussian model adaptive processing (GMAP) for improved ground clutter cancellation and moment calculation"; Proceedings of ERAD (2004); pp. 67-73; no date listed; copyright in the year 2004.*

(Continued)

*Primary Examiner*—Bernarr E Gregory
(74) *Attorney, Agent, or Firm*—Edwards Angell Palmer & Dodge LLP; David G. Conlin; George N. Chaclas

(57) ABSTRACT

Systems and methods that adapt to the weather and clutter in a weather radar signal and apply a frequency domain approach that uses a Gaussian clutter model to remove ground clutter over a variable number of spectral components that is dependent on the assumed clutter width, signal power, Nyquist interval and number of samples. A Gaussian weather model is used to iteratively interpolate over the components that have been removed, if any, thus restoring any overlapped weather spectrum with minimal bias caused by the clutter filter. The system uses a DFT approach. In one embodiment, the process is first performed with a Hamming window and then, based on the outcome, the Hamming results are kept or a portion of the process is repeated with a different window. Thus, proper windows are utilized to minimize the negative impact of more aggressive windows.

22 Claims, 9 Drawing Sheets

U.S. PATENT DOCUMENTS

| | | | | |
|---|---|---|---|---|
| 4,622,552 | A | * | 11/1986 | Andrews et al. ............ 342/196 |
| 5,140,332 | A | | 8/1992 | Martin et al. |
| 5,357,256 | A | * | 10/1994 | Peperone .................... 342/160 |
| 5,500,646 | A | | 3/1996 | Zrnic |
| 6,803,875 | B1 | | 10/2004 | Alford et al. |
| 6,803,876 | B2 | * | 10/2004 | Erkocevic-Pribic ......... 342/159 |
| 6,859,163 | B2 | | 2/2005 | Alford et al. |
| 7,049,997 | B2 | | 5/2006 | Alford et al. |
| 2004/0056791 | A1 | | 3/2004 | Alford et al. |

FOREIGN PATENT DOCUMENTS

| | | |
|---|---|---|
| EP | 0 051 361 | 5/1982 |
| EP | 0 061 941 | 10/1982 |
| EP | 0 064 305 | 11/1982 |
| EP | 0 184 424 | 6/1986 |
| EP | 1369703 A2 * | 12/2003 |
| WO | WO-2006/123084 | 11/2006 |

OTHER PUBLICATIONS

M. Dixon et al., "Echo Classification and Spectral Processing for the Discrimination of Clutter from Weather"; no date listed; paper submitted to AMS 32nd Conference on Radar Meteorology; Albuquerque, New Mexico, USA; Oct. 2005.*

J.Y.N. Cho et al., "Multi-PRI Signal Processing for the Terminal Doppler Weather Radar, Part I: Clutter Filtering"; Journal of Atmospheric and Oceanic Technology; vol. 22; May 2005; pp. 575-582.*

J.N. Chrisman et al., "A First Look at the Operational (Data Quality) Improvements Provided by the Open Radar Data Acquisition (ORDA) System"; no date listed.*

S. Torres et al., "Signal Design and Processing Techniques for WSR-88D Ambiguity Resolution, Part 8: Phase Coding and Staggered PRT Data collection, implementation, and clutter filtering"; a National Severe Storms Laboratory Report; Nov. 2004; National Oceanic and Atmospheric Administration (NOAA), National Severe Storms Laboratory; Norman, OK.*

Bech, et al, "The weather radar network of the Catalan Meteorological Service: description and applications" ; Proceedings of ERAD (2004), pp. 416-420.

Bucci, et al, "An Experiment with an S-Band Radar Using Pulse Compression and Range Sidelobe Suppression for Meteorological Measurements"; 1994 IEEE National Radar Conference, pp. 35-40.

Urkowitz, et al, "Doppler Tolerant Range Sidelobe Suppression in Pulse Compression Meteorological Radar", Proceedings IGRSS '92, Houston, TX, May 26-29, 1992, Vol. No. I, pp. 206-208.

Keeler, et al, "Pulse Compression for Weather Radar", 1995 IEEE International Radar Conference, pp. 529-535.

National Severe Storms Laboratory, 1999 Informal Publications by NSSL and CIMMS Scientists.

Schroth, et al, "A C-Band Coherent Polarimetric Radar for Propagation and Cloud Physics Research", 1988 American Meteorological Society, Dec. 1988, pp. 803-822.

Brandes, "Dual-Polarization Radar Fundamentals and Algorithm Prospects", National Center for Atmospheric Research, Research Applications Program, Boulder, CO, May 12, 2000.

Schroth, et al, "Technical Concept of the Planned Agile Coherent Polarization-Diversity Radar for the DFVLR", DFVLR, FB-NE, 8031 Oberpfaffenhofen, FRG, Bournemouth 1982, pp. 67-69.

Schroth, et al, "Coherent Polarimetrc C-Band Radar for Atomospheric Research", Proceedings of IGRSS '84 Symposium, Strasbourg Aug. 27-30, 1984, pp. 497-505.

Schroth, et al, "A C-Band Coherent Polarimetric Radar for Propagation and Cloud Physics Research", American Meteorological Society, May 21, 1988, pp. 803-822.

Keeler, et al, "Description of NCAR/FOF CP-2 Meteorolical Doppler Radar", Volume of the 24th Conference on Radar Meteorology, Mar. 27-31, 1989, Tallahassee, Florida, pp. 589-592.

Chandrasekar, et al, "Antenna Pattern Analysis and Measurements for Multiparameter Radars", Journal of Atmospheric and Oceanic Technology, vol. 10, No. 5, Oct. 1993, pp. 674-683.

Keeler, et al, "S-Pol: NCAR's Polarimetric Doppler Research Radar", IGARRS-2000, Honolulu, Hawaii, Jul. 24-28, 2000, pp. 1-4.

Schiff, et al, "Details of the Production Model AN/CS-9 Storm Detector Radar", Allerton Estate, Oct. 1, 1951, pp. 221-225.

Keeler, "A Brief Survey of Antenna Mounted Receivers for Weather Radar", r-J-K Consulting, LLC, Boulder, CO, Sep. 27, 2004.

Leonadi, et al, Polar 55C: A C-Band Advanced Meteorological Radar Developed for C.N.R., Italy; American Meteorological Society, Conference Volume: 22nd Conference on Radar Meteorology, Sep. 10-13, 1984, pp. 238-243.

Doviak, et al, "Considerations for Polarmetric Upgrades to Operational WSR-88D Radars"; Journal of Atmospheric and Oceanic Technology, Mar. 2000, vol. 7, pp. 257-278.

Enterprise Electronics Corp., Statement of Work and Cost Proposal P1038-81/82 for Deutsche Forschungs Und Versuchsanstaslt Fuer Luet Und Raumfahrt E.V., Aug. 1982, pp. 1-31.

Doviak, et al, Polarimetric Upgrades to Improve Rainfall Measurements; National Severe Storms Laboratory Report, Apr. 1998, pp. 1-110.

Hendry, et al, Application of Waveguide Switching in Dual-Channel Polarization Diversity Radar, and Preliminary Results, pp. 352-357.

Keenan, "The BMRC/NCAR C-Band Polarmetric (C-POL) Radar System"; American Meteorolgical Society, Aug. 1998, pp. 871-886.

Meischner, "Advanced Weather Radar Systems in Europe: the Cost 75 Action"; Bulletin of the American Meteorological Society, vol. 78, No. 7, Jul. 1997, pp. 1411-1430.

Whiton, et al, "History of Operational Use of Weather Radar by U.S. Weather Services. Part I: The Pre-NEXRAD Era"; American Meterological Society, Weather & Forcasting, vol. 13, Issue 2 (Jun. 1998), pp. 219-243.

Ginn, "From PPI to Dual Doppler Images"; Hong Kong Observatory, Presented at the 32nd Session of the ESCAP/WMO Typhoon Committee, Seoul, Republic of Korea, Nov. 23-29, 1999.

Joe, et al, "Evolution of the Canadian Operational Radar Network"; Proceedings of ERAD (2002), pp. 370-382.

Wurman, :Design and Deployment of a Portable, Pencil-Beam, Pulsed, 3-cm Doppler Radar; American Meteorological Society, Journal of Atmospheric and Oceanic Technology, vol. 14, Issue 6, 1997, pp. 1502-1512.

Bringi, et al, "Chapter 19a—Technology of Polarization Diversity Radars for Meteorology"; pp. 153-190.

* cited by examiner

Weather only

Weather plus clutter

SYSTEM AND METHOD FOR PROCESSING DATA IN WEATHER RADAR

CROSS-REFERENCE TO RELATED APPLICATION

This application claims priority to U.S. Provisional Patent Application No. 60/640,713, filed Dec. 30, 2004, which is incorporated herein by reference.

BACKGROUND OF THE INVENTION

1. Field of the Invention

The subject disclosure relates to weather radar systems, and more particularly to an improved system and method for processing weather radar signals.

2. Background of the Related Art

In the past, weather radar processors have been built using the approach of a fixed notch-width infinite impulse-response (IIR) clutter filter followed by time-domain autocorrelation processing (so-called pulse-pair processing). These techniques require minimal storage and very few computational multiply accumulate steps (MAC's) per pulse per range bin. The algorithms are well suited for real time implementation and indeed, since there was no ability to buffer large numbers of T and Q samples, there was little choice.

Despite the advantages of these systems, several major drawbacks exist. For example, the impulse response of the IIR filter is, as the name implies, infinite. Thus, perturbations that are encountered, such as a very large point clutter target or change in the pulse repetition frequency (PRF), effect the filter output for many pulses sometimes effecting the output for several beamwidths. The use of clearing pulses or filter initialization can mitigate the effect of this at the expense of effectively reducing the number of pulses.

Further, the filter width that is necessary to remove clutter bias depends on tile strength of the clutter. If the clutter is very strong, then a wider filter is required since the clutter power will exceed the noise power for a greater fraction of the Nyquist interval. In other words, the fixed notch-width is guaranteed to be either not aggressive enough for strong clutter and overly aggressive in removing weather echoes even when there is no clutter. When no clutter is present, the filter will bias the intensity and velocity estimates when the weather target is in the stop band of the filter (overlapped). Operators are required to manually select a filter that is sufficiently wide to remove the clutter without being too wide that the filter attenuates weather data. Clutter filter maps have been used in some systems to try and address this, but the problem of scan rates and local target properties (i.e., width) change from day-to-day without the easy ability to accommodate this variation Some other systems have employed fast Fourier transform (FFT) processing. The advantage of an FFT approach is that the ground clutter filtering is made adaptive by searching in the frequency domain to determine the boundary between the system noise level and the ground clutter. The FFT is inherently a finite impulse response (FIR) block processing approach that does not have the transient behavior problems of the IIR filter. It is possible to interpolate over spectrum components that are removed to minimize the effects of filter bias. However, the FFT approach has two distinct disadvantages:

i) the spectrum resolution is limited by the number of points in the FFT which is constrained to be a power of 2 (e.g., 16, 32, 64, 128). Operational systems typically use 32 or 64-point FFT's. If the number of points is low, then clutter will be spread over a larger fraction of the Nyquist domain thus obscuring weather targets; and ii) to provide the best performance, a time-domain window is applied to the IQ values prior to performing the FFT. When the clutter is very weak, even a rectangular window or uniform weighting is adequate for removing clutter. However, when the clutter is strong, then a more aggressive window such as the Hamming or the very aggressive Blackman must be used to isolate weather signals from strong clutter if at all possible. The drawback of these windows is the effective reduction of the number of samples that are processed since the points at the beginning and end of a time series are weighted less than those in the middle. The result is estimates with a higher variance. Lastly, if a fixed notch-width rather than an adaptive width approach is used, then the same types of problems inherent in the IIR filter will exist. As can be seen from the above, prior art systems and methods have limited processing ability.

SUMMARY OF THE INVENTION

There is a need, therefore, for an improved unit which advantageously applies advances in processing to overcome one or more of the disadvantages identified above.

It is an object of the subject technology to adaptively process weather signals by using a width that adapts in the frequency domain to adjust for the effects of $PRF^1$, the number of samples and the absolute amplitude of the clutter power, while requiring minimal operator intervention to set the filter.

It is another object of the subject technology to adaptively process weather signals where if there is no clutter present, the system does little or no filtering.

It is still another object of the subject technology to adaptively process weather signals such that the system repairs the damage to overlapped or near zero velocity weather targets.

It is also object of the subject technology to adaptively process weather signals by automatically determining the discrete Fourier transform processing (DFT) window to be minimally aggressive to remove the clutter and, thereby, reduce the variance of the moment estimates.

The present invention is directed to a system that calculates I/Q time series values on a PCI digital receiver card and passed over the PCI bus into memory for processing "off-line" rather than in real-time, with the constraint that the average throughput not exceed the data acquisition time. The process uses adaptive algorithms that operate iteratively to automatically optimize the processing approach while doing minimal damage to overlapped weather and providing aggressive cancellation when required by strong clutter. A preferred embodiment is further operative to be unattended in that any local operator intervention to select the best clutter filter is not required.

It should be appreciated that the present invention can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the drawings wherein.

DETAILED DESCRIPTION OF PREFERRED EMBODIMENTS

Figure 1:
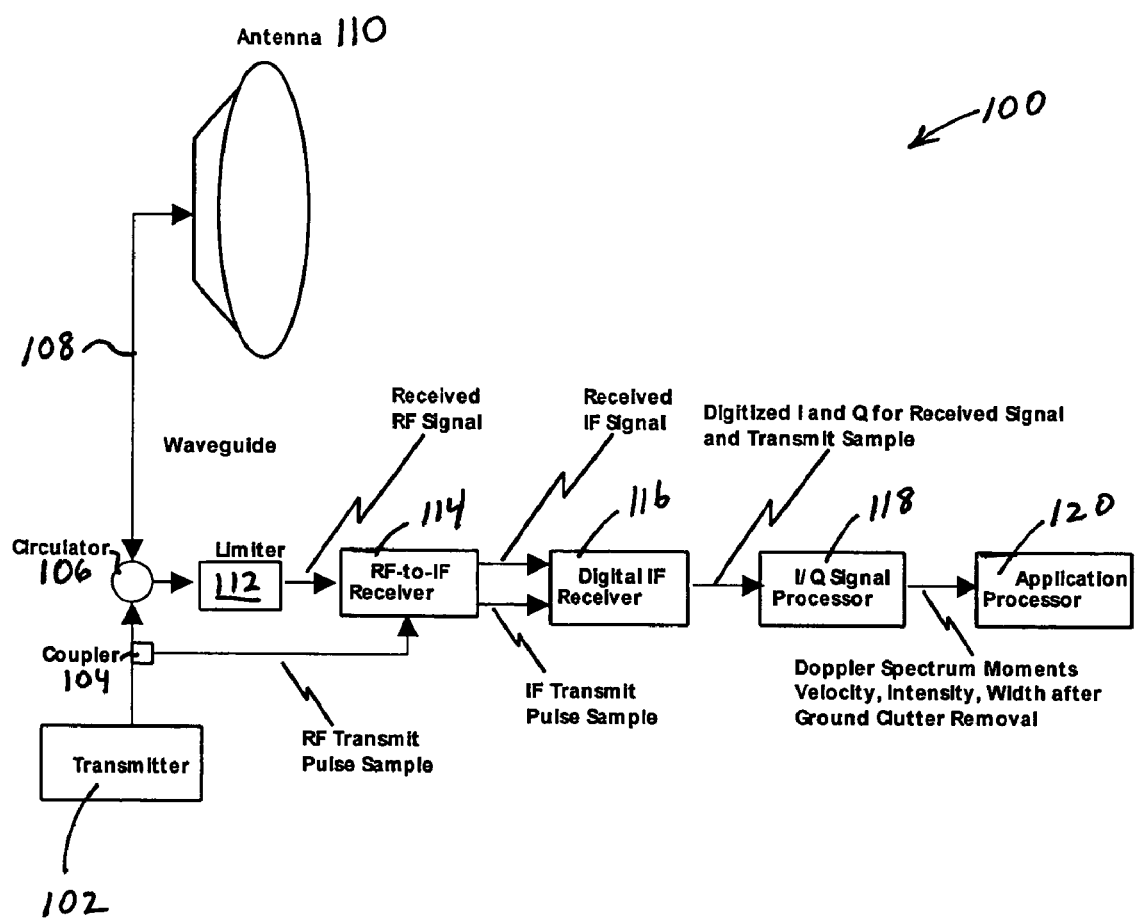
FIG. 1 is a block diagram of a weather radar system in accordance with the subject technology.

The present invention overcomes many of the prior art problems associated with processing data generated by weather radar. The advantages, and other features of the systems and methods disclosed herein, will become more readily apparent to those having ordinary skill in the art from the following detailed description of certain preferred embodiments taken in conjunction with the drawings which set forth representative embodiments of the present invention and wherein like reference numerals identify similar structural elements. Unless otherwise specified, the illustrated embodiments can be understood as providing exemplary features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed systems or methods. Additionally, the shapes and sizes of components are also exemplary and unless otherwise specified, can be altered without materially affecting or limiting the disclosed technology. All relative descriptions herein such as top, bottom, left, right, up, and down are with reference to the Figures, and not meant in a limiting sense.

In brief overview, the present technology implements improved algorithms that adapt to the weather and clutter that is present and, if necessary, repeat with varying parameter settings to achieve an optimal result. The systems and methods apply a frequency domain approach that uses a Gaussian clutter model to remove ground clutter over a variable number of spectral components that is dependent on the assumed clutter width, signal power, Nyquist interval and number of samples. A Gaussian weather model is then used to iteratively interpolate over the components that have been removed, if any, thus restoring any overlapped weather spectrum with minimal bias caused by the clutter filter.

The system uses a DFT rather than an FFT approach to achieve the highest possible spectrum resolution. In one embodiment, the process is first performed with a Hamming window and then, based on the outcome, the Hamming results are kept or a portion of the process is repeated with either the rectangular or Blackman window. Thus, less aggressive spectrum windows are utilized, depending on the strength of the ground clutter, to minimize the negative impact of more aggressive windows on the variance of the moment estimates.

It is envisioned that the process is best applied to clutter, weather and noise where the spectrum width of the weather signal is greater than that of the clutter. Preferably, the Doppler spectrum consists of ground clutter, a single weather target and noise as opposed to bi-modal weather targets, aircraft and birds mixed with weather. Further, the process functions best if the width of the clutter is approximately known. The width of the clutter is determined primarily by the scan speed and to a lesser extent by the climatology of the local clutter targets. The assumed width is used to determine how many interior clutter points are removed. Also, the shape of the clutter is approximately Gaussian so that the number of interior clutter points to remove can be calculated therefrom. The shape of the weather is also assumed to be approximately Gaussian for allowing reconstructing filtered points in overlapped weather.

Doppler Weather Radar System

Referring now to FIG. 1, a Doppler weather radar system is shown and referred to generally by the reference numeral 100. It is noted that the same basic block diagram would also apply to a wind profiler system and other systems as would be appreciated by those of ordinary skill in the pertinent art. A transmitter 102 generates high power radio frequency (RF) energy pulses at a frequency of several GHz depending on the radar band. A small portion of the RF pulse energy, known as the RF transmit pulse sample, is sampled by a coupler 104. The remaining RF pulse energy passes through a circulator 106 and ultimately exits via a waveguide 108 to an antenna 110. The antenna 110 radiates the RF pulse energy into space according to the antenna characteristics. The transmitted RF pulse energy is backscattered from targets such as liquid water drops or ice particles as well as other targets such as ground clutter, birds, insects and aircraft. The backscattered power is focused and received by the antenna 110 and then directed by the circulator 106. To protect the downstream elements, such as receivers, from high-energy leakage from the transmitter 102, a limiter 112 is used. Alternatively, a transmit/receive switch and other known elements are used instead of the limiter 112. The received RF energy is then processed by an analog RF-to-IF (intermediate frequency) receiver system 114. A desirable IF frequency is several MHz and, in some circumstances, two IF stages are used to produce the final IF. The receiver 114 also processes the RF transmit pulse sample from the coupler 104 to convert the RF transmit pulse sample to an IF transmit pulse sample as a second analog output.

The two analog outputs from the receiver 114 are then sampled by high-speed analog-to-digital converters in a digital receiver 16. In the digital receiver 116, the two analog outputs from the receiver 114 are further processed using digital filtering techniques to obtain an "in-phase" (I) and quadrature (Q) signals, which are in digital form for each range increment of the radar range for each transmit pulse. The I/Q signal processor 118 receives the I and Q signals and performs various processing and corrections to remove artifacts such as ground clutter, aircraft, interference from other radars, etc. and outputs the final so-called "Doppler spectrum moments" or simply the "moments" which are the intensity, mean radial velocity and spectrum width of the weather targets in the beam for each range increment. In a preferred embodiment, the moments are based on processing many pulses. The moments are then output to an application processor 120, which performs analyses and generates various displays for meteorological interpretation. It is envisioned that the various modules can be combined together on a common computer platform. For example, the digital receiver 116, the I/Q signal processor 118 and the applications processor 120 can be combined on a common computer platform. The following description is directed to the processing algorithm that is used to remove ground clutter from the I and Q signals in the I/Q signal processor 118.

Basic Definitions and Nomenclature

Table 1 summarizes some of the algebraic quantities that are measured and computed within the system 100. The type of the quantity (i.e., real or complex) is also given. Subscripts are sometimes used to denote successive samples in time from a given range bin. For example, $s_n$ denotes the "I" and "Q" time series or "video" sample from the n'th pulse from a given range bin. In some cases, the subscripts denoting the pulse (time) are dropped for simplicity. The descriptions of all the data processing algorithms are largely phrased in terms of the operations performed on data from a single range bin, identical processing then being applied to all of the selected ranges. Thus, range subscripts are not included in this data notation.

TABLE 1

| abbreviation | quantity | type |
| --- | --- | --- |
| p | Instantaneous IF-receiver data sample | Real |
| b | Instantaneous Burst-pulse data sample | Real |
| IQ | Instantaneous quadrature receiver components | Real |
| s | Instantaneous time series phaser value | Complex |
| s¢ | Time series after clutter filter | Complex |
| $T_0$ | Zero$^{th}$ lag autocorrelation of A values | Real |
| $R_0$ | Zero$^{th}$ lag autocorrelation of A¢ values | Real |
| $R_1$ | First lag autocorrelation of A¢ values | Complex |
| $R_2$ | Second lag autocorrelation of A¢ values | Complex |
| SQI | Signal Quality Index | Real |
| V | Mean velocity | Real |
| W | Spectrum Width | Real |
| CCOR | Clutter correction | Real |
| LOG | Signal to noise ratio for thresholding | Real |
| SIG | Signal power of weather | Real |
| C | Clutter power | Real |
| N | Noise power | Real |
| Z | Corrected Reflectivity factor | Real |
| T | UnCorrected Reflectivity factor | Real |

It is frequently convenient to combine two simultaneous samples of "I" and "Q" into a single complex number or a "phaser" of the form:

$$s = I + jQ$$

where "j" is the square root of −1. Most of the algorithms are defined in terms of the operations performed on the "s"'s, rather than the "I"'s and "Q"'s. The use of the complex terms leads to a more concise mathematical expression of the signal processing techniques being used. In actual operation, the complex arithmetic is simply broken down into its real-valued component parts in order to be computed by the RVP8 hardware. For example, the complex product:

$$s = W \cdot Y$$

is computed as $$\text{Real}\{s\} = \text{Real}\{W\}\text{Real}\{Y\} - \text{Imag}\{W\}\text{Imag}\{Y\}$$

$$\text{Imag}\{s\} = \text{Real}\{W\}\text{Imag}\{Y\} + \text{Imag}\{W\}\text{Real}\{Y\}$$

where "Real{ }" and "Imag{ }" represent the real and imaginary parts of their complex-valued argument. Note that all of the expanded computations are themselves real-valued. In addition to the usual operations of addition, subtraction, division, and multiplication of complex numbers, the RVP8 employs three additional unary operators: "| |", "Arg" and "*". Given a number "s" in the complex plane, the magnitude (or modulus) of s is equal to the length of the vector joining the origin with "s", i.e. by Pythagoras:

$$|s| = \sqrt{\text{Real}\{s\}^2 + \text{Imag}\{s\}^2}$$

The signed (CCW positive) angle made between the positive real axis and the above vector is:

$$\phi = \text{Arg}\{s\} = \arctan\left[\frac{\text{Imag}\{s\}}{\text{Real}\{s\}}\right]$$

where this angle lies between −π and +π and the signs of Real{s} and Imag {s} determine the proper quadrant. Note that this angle is real, and is uniquely defined as long as |s| is non-zero. When |s| is equal to zero, Arg{s} is undefined. Finally, the "complex conjugate" of "s" is that value obtained by negating the imaginary part of the number, i.e., $$s^* = \text{Real}\{s\} - j\,\text{Imag}\{s\}.$$

Note that Arg{s*}=−Arg{s}.

A computer means one or more digital data processing devices used in connection with various embodiments of the invention. Such a device generally can be a personal computer, computer workstation (e.g., Sun, HP), laptop computer, server computer, mainframe computer, handheld device, information appliance, printed circuit board with components or any other type of generic or special-purpose, processor-controlled device capable of receiving, processing, displaying, and/or transmitting digital and analog data. A typical computer includes random access memory (RAM), mechanisms and structures for performing I/O operations, a storage medium such as a magnetic hard disk drive(s), and an operating system (e.g., software) for execution on the central processing unit. The computer also has input and output devices such as a keyboard and monitor, respectively. A processor generally is logic circuitry that responds to and processes instructions that drive a computer and can include, without limitation, a central processing unit, an arithmetic logic unit, an application specific integrated circuit, a task engine, and/or any combinations, arrangements, or multiples thereof. As can be seen, the terms computer and processor are interchangeable along with the term reciever and such is to be appreciated in review of the subject specification. Software or code generally refers to computer instructions which, when executed on one or more digital data processing devices, cause interactions with operating parameters, sequence data/parameters, database entries, network connection parameters/data, variables, constants, software libraries, and/or any other elements needed for the proper execution of the instructions, within an execution environment in memory of the digital data processing device(s). A module is a functional aspect, which may include software and/or hardware. Typically, a module encompasses the necessary components to accomplish a task. It is envisioned that the same hardware could implement a plurality of modules and portions of such hardware would be available as needed to accomplish the task. As such, the term module is also interchangeable with computer, processor and receiver. Those of ordinary skill will recognize that the software and various processes discussed herein are merely exemplary of the functionality performed by the disclosed technology and thus such processes and/or their equivalents may be implemented in commercial embodiments in various combinations without materially affecting the operation of the disclosed technology.

Overall Signal Processing

Figure 2:
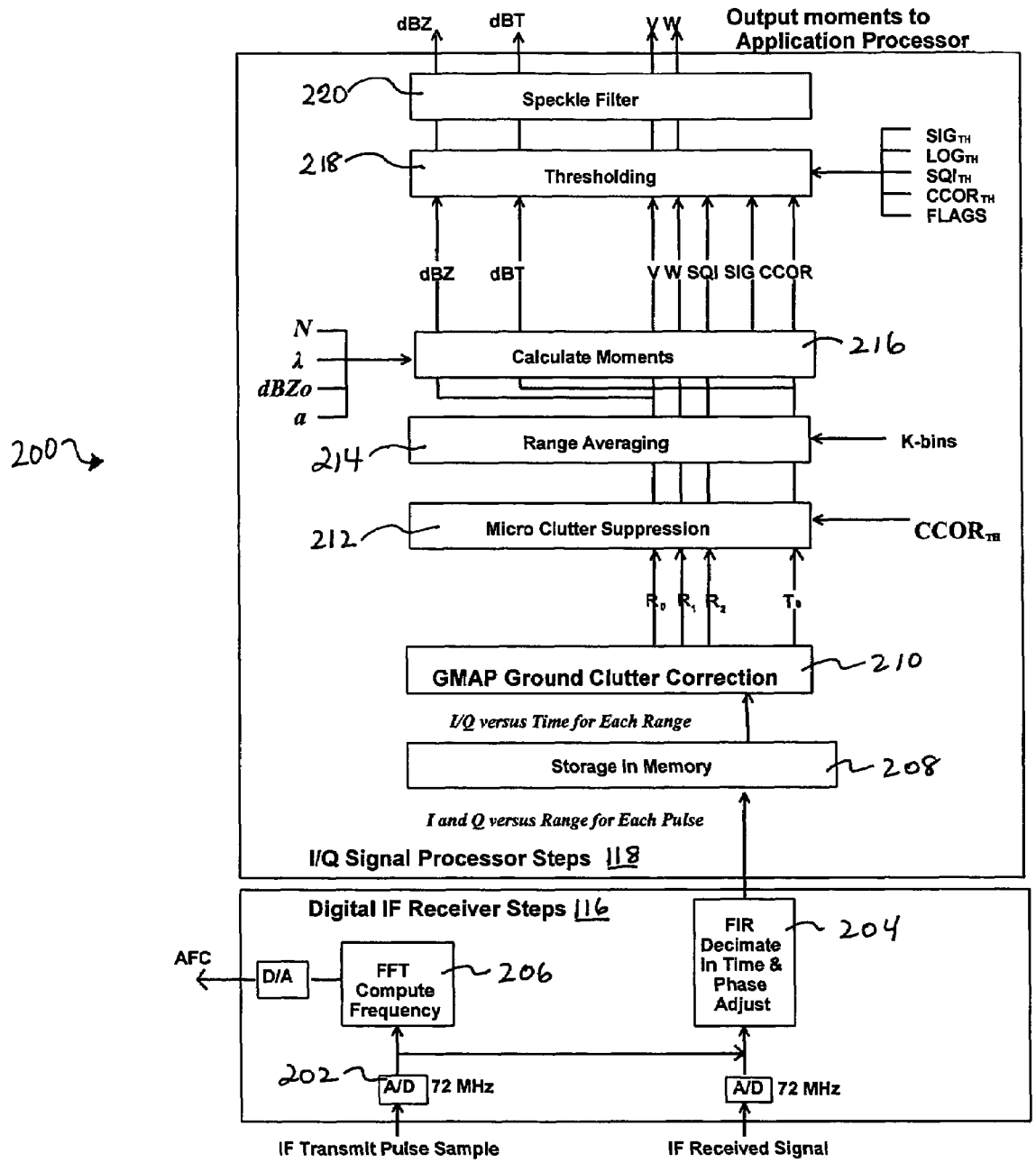
FIG. 2 is a flow diagram illustrating the weather radar system of FIG. 1 processing weather radar data.

Referring now to FIG. 2, a process 200 for processing the received signal in accordance with the subject technology is shown. In the process 200, the system 100 converts the weather radar intermediate frequency (IF) signal into reflectivity, velocity, and width, removes the effects of ground clutter and repairs the damage to the weather echo that can be caused by the clutter-filtering process. It is to be recognized that the process 200 utilizes the system 100 of FIG. 1 as indicated by the consistently used reference numerals although many variations are possible as would be appreciated by those of ordinary skill in the pertinent art.

Within the digital IF receiver 116, a digitized time multiplexed IF transmit pulse is generated based on the received IF signal. A/D converters 202, operating at 72 MHz, receive the IF received signal and the IF transmit pulse sample, respectively. A decimator/phase adjustor 204 and FFT module 206 modify the received IF signal to produce the digitized time multiplexed IF transmit pulse sample. The digitized time multiplexed IF transmit pulse sample is followed by the digitized I/Q values versus range for each pulse. The signal is processed by a FIR filter in the decimator/adjustor 204 of the digital If receiver 116. Typically, on the order 1024 range bins of I/Q are acquired for each pulse, but there can be more or less depending on the range resolution of the radar and the maximum range that is processed. In some radar systems, particularly those with magnetron transmitters, the measured phase of the I/Q of the transmit pulse is used to correct the phase of each I/Q value for that pulse. The correction is performed by treating I and Q as a 2 dimensional vector and performing a vector multiply between a unit vector (length 1) that has the same phase as the transmit pulse and the I/Q vector at each range for that pulse. As a result, the I/Q vector of each pulse rotates to correct for the transmit phase.

Figure 3:
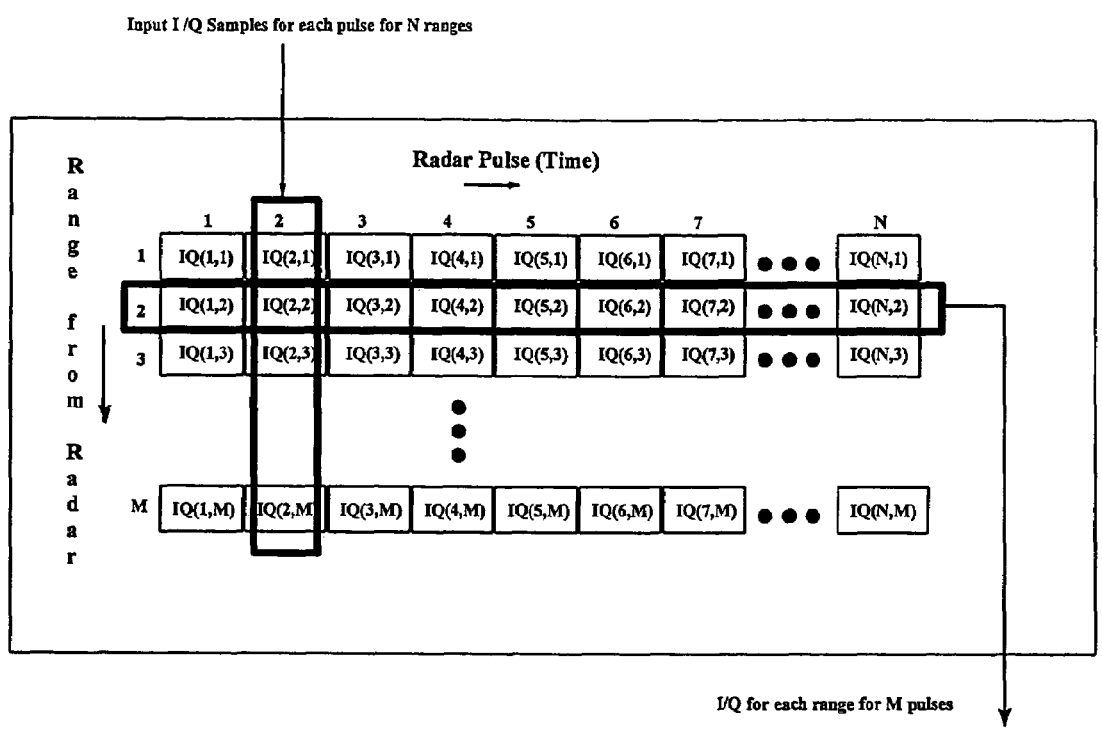
FIG. 3 is a graphical depiction of I/Q values being stored in accordance with the process of FIG. 2.

The values of I/Q, corrected for the phase of the transmit pulse, are passed from the digital IF receiver 116 to the I/Q signal processor 118 and stored therein in memory 208 for each pulse as a function of range. For a given range, the I/Q are extracted from the memory 208 for a series of pulses. The time period is known as the coherent processing interval or CPI. A CPI preferably has about 50 pulses, but more or less can be used depending on the averaging requirements of the radar data acquisition. The insertion and extraction of the pulses into the memory 208 is illustrated in FIG. 3 below for the general case of N discrete ranges and M pulses.

Still referring to FIG. 2, the I/Q values for each range over M pulses are called the "time series" and serve as the starting point for the GMAP ground clutter correction performed at step 210. Step 210 is described in more detail below with respect to FIGS. 4-10. The output from step 210 of GMAP ground clutter correction includes autocorrelation is known as R0, R1 and R2, the autocorrelations at lag zero, lag one and lag two, During step 210, R0, R1 and R2 are filtered by the I/Q signal processor 118 to remove ground clutter and to repair the interfering effects of the ground clutter filter. In addition, the autocorrelation at lag zero without clutter filtering is calculated (T0). R0 is the signal power after clutter removal and is a real number. T0 is the signal power with the clutter still present and is also a real number. R1 and R2 are complex numbers having real and imaginary parts.

At step 212, if range averaging is being utilized, micro clutter suppression is used to remove ground clutter by making an estimate of the clutter correction and discarding range bins where the calculated clutter correction (CCOR) exceeds a user-defined threshold. $CCOR_{HL}$. As a result, strong clutter bins are prevented from damaging the range averaging in the subsequent step 214.

At step 214, range averaging is performed by averaging the real and imaginary parts of R0, R1, R2 and T0 (as appropriate) over a user selectable number of bins K. If any bins failed the clutter micro suppression test in the previous step 212, such bins are not used in the range averaging. Thus, the range averaging increases the number of samples averaged which results in more accurate estimates of R0, R1, R2 and T0, and reduces the number of bins to save processing in subsequent steps as well as reduce data storage and communication resources.

At step 216, the system 100 calculates the moments as would be known to those of ordinary skill in the pertinent art. The moments are the mean radial velocity V with clutter correction, the calibrated radar reflectivity factor with clutter correction Z (related to the received power), the Doppler spectrum width W and the radar reflectivity factor without clutter correction T. Several calibration parameters serve as input into step 216 such as calibration reflectivity dBZo, radar wavelength $\lambda$, gaseous attenuation constant a and receiver noise power N.

To eliminate bins with weak signals or moment values of high uncertainty, step 218 performs thresholding of the data. Preferably, the thresholds are user-selected. If the computed value does not pass the threshold comparison test, the range bin is flagged as "Thresholded". Thresholded range bins are typically rejected. Exemplary parameters to threshold are signal-to-noise ratio LOG, weather signal power SIG, clutter correction CCOR and signal quality index SQI.

At step 220, a speckle filter is applied to remove isolated single bins of either velocity/width or intensity data that have no valid data surrounding them, i.e., the moment values are surrounded by thresholded bins. In a preferred embodiment, this filtering is done in one dimension (in range only) or in two dimensions, i.e., in range and successive CPI's, which represent different azimuth angles for a scanning antenna. As a result of eliminating single pixel speckles, the thresholds can be reduced for greater sensitivity with fewer false alarms (i.e., speckles). Thus, the moment values with GMAP clutter correction, thresholding and speckle filtering are generated by the system 100 for further processing by the application processor 120 for meteorological analysis and display.

Generally, the process 200 provides many advantages such as using DFT as opposed to FFT. The advantage of the DFT approach is that the spectrum resolution is preserved regardless of the number of samples that are used. The FFT approach is limited to use a number of samples that is a power of 2 (i.e., 2, 4, 8, 16, 32, . . . ). Further, ground clutter is only removed when present so that there is minimal if any damage to the spectrum of weather targets when the clutter is weak or non-existent. The optimal spectrum processing window (e.g., rectangular, Hamming and Blackman) is determined automatically depending on how much ground clutter is present. If the ground clutter is strong than a low side-lobe window is used such as the Blackman. If the ground clutter is very weak, then no window is used (the rectangular weighting). This results in estimates of mean velocity, spectrum width and reflectivity that have the minimal statistical variance. The system 100 also automatically adjusts the width of the clutter filter for the radar wavelength, pulse repetition rate (PRF), number of pulse samples (spectrum components), and the strength of the ground clutter. Additionally, the system 100 removes the bias in the reflectivity, velocity and spectrum width that is caused by traditional clutter filter approaches (e.g., the infinite impulse response filter or IIR), which remove completely or partially any weather echoes that are near zero Doppler velocity. The system 100 accomplishes this by performing an iterative interpolation using a Gaussian model to replace the spectrum points that are removed by the ground clutter filtering process.

GMAP Ground Clutter Correction Step

Figure 4:
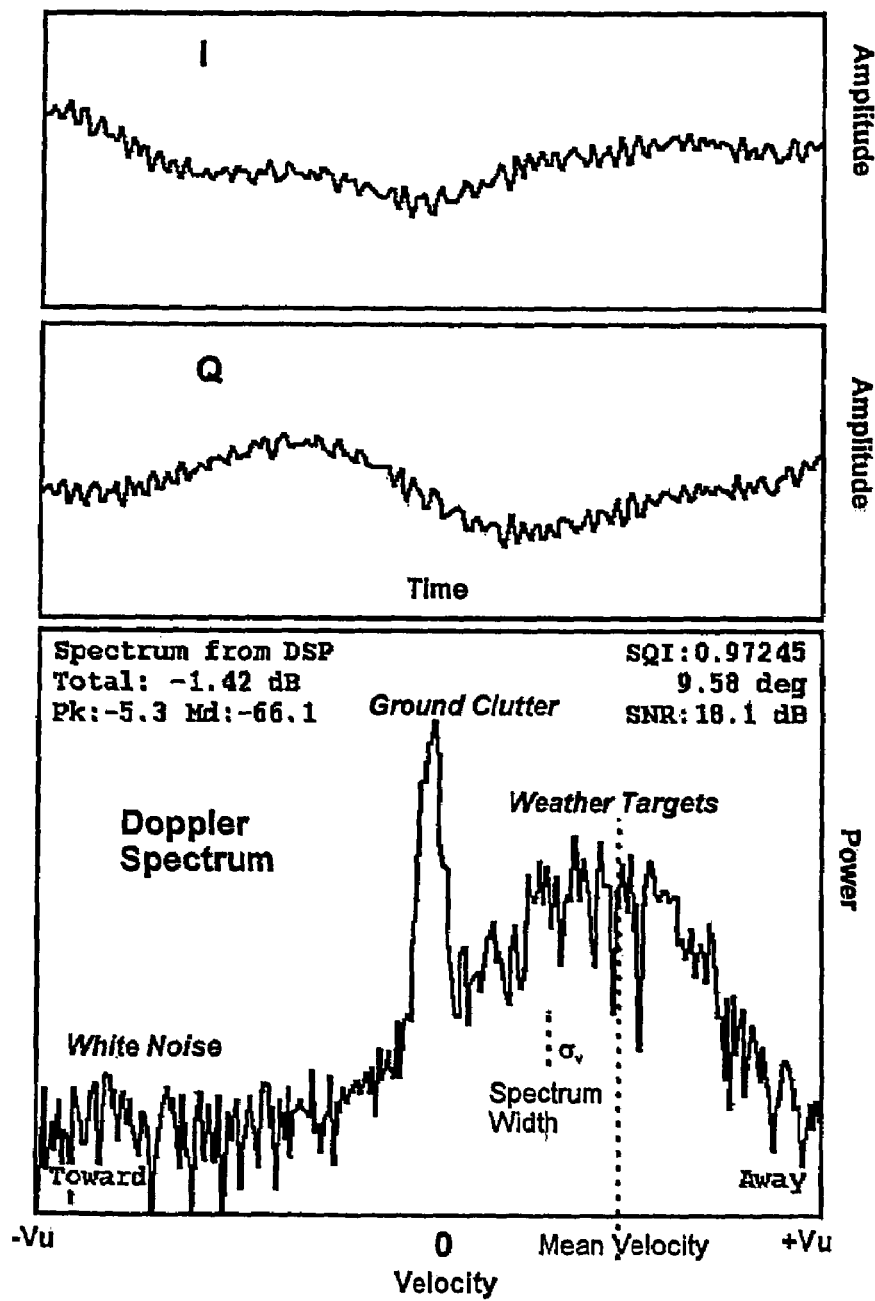
FIG. 4 graphically illustrates a time series and Doppler power spectrum.

Referring now to FIG. 4, at step 210 of FIG. 2, the system 100 transforms the time series to a frequency domain via DFT. The time series for a radar range bin includes of an array of complex numbers:

$$s_n = [I_m + jQ_m] \text{ for } m=1, 2, 3, \ldots, M$$

where "j" is $-1^{1/2}$. The time series are the starting point for calculations performed within the system 100. The top part of FIG. 4 shows I and Q values for a simulated time series. The Doppler power spectrum, or simply the "Doppler spectrum", is a visual representation of the meteorological information content of the time series. The bottom part of FIG. 4 shows an example of a Doppler power spectrum for the time series shown in the upper part of FIG. 4. The Doppler spectrum typically contains white noise, weather signal and ground clutter. Other types of targets such as sea clutter, birds, insects, aircraft, surface traffic, second trip echo, and the like may also be present in some cases.

The "Doppler power spectrum" is obtained by taking the magnitude squared of the DFT of the input time series, i.e. for a continuous time series, $$S(\omega) = |F\{s(t)\}|^2$$

where S denotes the power spectrum as a function of frequency $\omega$ and F denotes the Fourier transform of the continuous complex time series s(t). The Doppler power spectrum is real-valued and equal to the magnitude squared of the complex Fourier transform of s(t). It is envisioned that a pulsed radar operates with discrete rather than continuous time series, i.e., there is an I and Q value for each range bin for each pulse. Using the DFT yields the discrete power spectrum. Note that in the special case when we have $2^n$ input time series samples (e.g., 16, 32, 64, 128, ...), a fast Fourier transform algorithm FFT is preferably used because the FFT would be significantly faster than the full DFT.

The DFT has the form:

$$S_k = |DFT_k\{w_m s_m\}|^2 = \sum_{m=1}^{M} w_m s_m \exp\left[-j \frac{2\pi mk}{M}\right]$$

Figure 5:
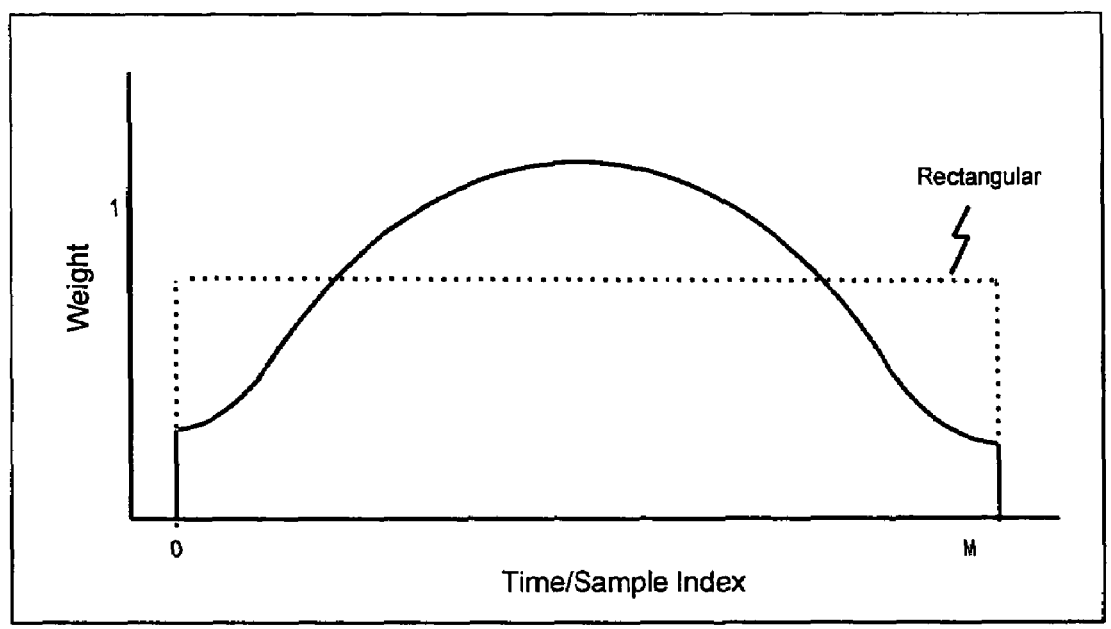
FIG. 5 illustrates a time series window.

In one embodiment, a weighting function or "window" $w_m$ is applied to the input time series s, to mitigate the effect of the DFT assumption of periodic time series. Preferably, the system 100 supports different windows such as the Hamming, Blackman, Von Han, Exact Blackman$^2$ and a rectangular window for which all spectral components are weighted equally. One form of a spectrum window is shown in FIG. 5, which illustrates how the edge points of the time series are de-emphasized and the center points are over emphasized. The dashed line would correspond to the rectangular window.

Selecting a Window

The "gain" of the window is set to preserve the total power. Even though the window gain can be adjusted to conserve the total power, there is an effective reduction in the number of samples which increases the variance (i.e., uncertainty) of the moment estimates. For example, the variance of the total power is greater when computed from a spectrum with Blackman weighting as compared to using a rectangular window. This is because there are effectively fewer samples because of the de-emphasis of the end points.

Figure 6:
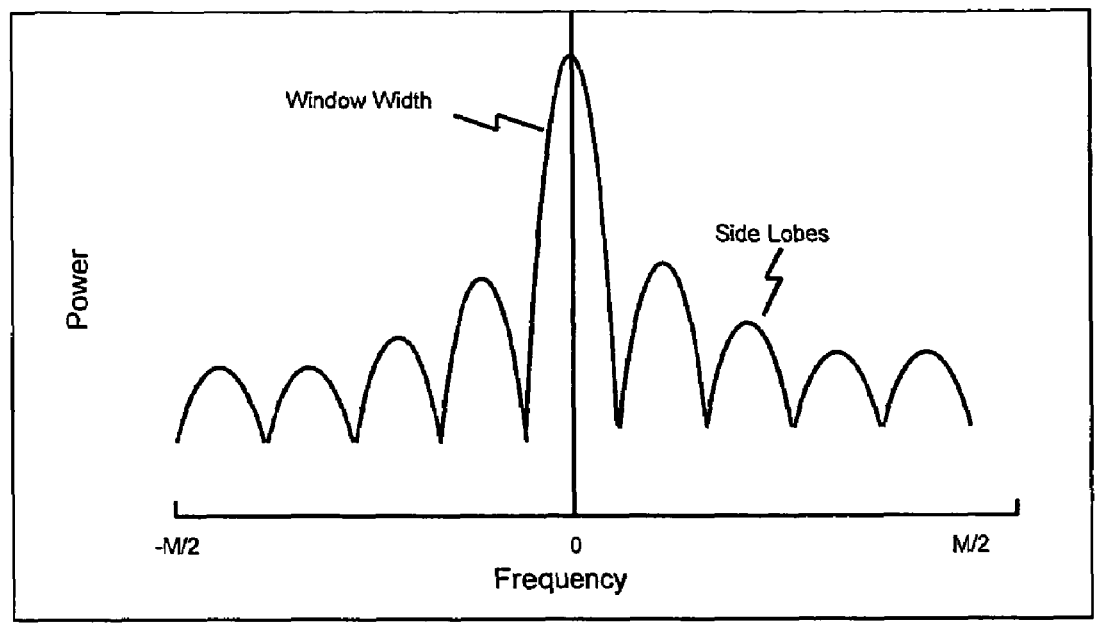
FIG. 6 illustrates an impulse response of a window.

The DFT of the window itself is known as its impulse response which shows all of the frequencies that are generated by the window itself. A generic example of the DFT of the window is shown in FIG. 6. In FIG. 6, the "side lobe" frequencies have substantial power. For weather signals alone, the substantial power of the side lobes is manageable. But if there is strong clutter mixed in, then the side lobe power from the clutter can obscure a relatively weaker weather signal. The rectangular window has the worst sidelobes, but the narrowest window width. However, the rectangular window provides the lowest variance estimates of the moment parameters in the absence of clutter. More "aggressive" windows have lower side lobe power at the expense of a broader impulse response and an increased variance of the moment estimates.

In summary, applying the DFT approach and spectrum windows requires selecting an appropriate combination for the particular data received. When the clutter is strong, an aggressive spectrum window is required to contain the clutter power so that the side lobes of the window do not mask the weather targets. The side lobe levels of some acceptable windows are 12 dB for rectangular, 40 dB for Hamming and 55 dB for Blackman. More aggressive windows typically have a wider impulse response. This effectively increases the spectrum width. Regarding the exemplary windows noted above, the impulse response of a rectangular window is relatively narrow, a Hamming intermediate and a Blackman relatively wider. Windows effectively reduce the number of samples resulting in higher variance moment estimates. Rectangular is the best case, Hamming is intermediate and Blackman provides the highest variance moment estimates. Thus, a preferred approach is to use the least aggressive window possible in order to contain the clutter power that is actually present, i.e., an adaptive approach.

Auto correlations

The final spectrum moment calculation for total power or SNR, mean velocity and spectrum width uses autocorrelation moment estimation techniques, preferably in all processing modes. Typically the first three lags are calculated, denoted as $R_0$, $R_1$ and $R_2$ in the formulas below. However, there are two ways to calculate $R_0$, $R_1$ and $R_2$, i.e., a time domain or frequency domain calculation. In the time domain approach, the autocorrelations are computed directly from the I and Q samples while in the frequency domain approach, the autocorrelations are computed by taking the inverse DFT of the Doppler power spectrum. Note that only the first three terms are calculated in the inverse DFT case. The time domain and frequency domain techniques are nearly identical except that the method of taking the inverse DFT of the power spectrum relies on the assumption that the time series is periodic. Another difference is that for time domain calculation only a rectangular weighting is used.

Time domain calculation of the autocorrelations and the corresponding physical models are according to the following:

| Parameter and Definition | Physical Model |
| --- | --- |
| $T_0 = \frac{1}{M} \sum_1^M s_n^* s_n$ | $S + C + N$ |
| $R_0 = \frac{1}{M} \sum_1^M s_n'^* s_n'$ | $S + N$ |
| $R_1 = \frac{1}{M-1} \sum_1^{M-1} s_n'^* s_{n+1}'$ | $S \exp[j\pi V' - \pi^2 W^2/2]$ |
| $R_2 = \frac{1}{M-2} \sum_1^{M-2} s_n'^* s_{n+2}'$ | $S \exp[j2\pi V' - 2\pi^2 W^2]$ | where M is the number of pulses in the time average. Here, s' denotes the clutter-filtered time series, s denotes the original unfiltered time series and the * denotes a complex conjugate. $T_O$ for the unfiltered time series is proportional to the sum of the meteorological signal S, the clutter power C and the noise power N. $R_0$ is equal to the sum of the meteorological signal S and noise power N which is measured directly on the system 100 by periodic noise sampling, $T_O$ and $R_0$ are used for calculating the dBZ values, the equivalent radar reflectivity factor which is a calibrated measurement.

Referring again to FIG. 4, the physical models for $R_0$, $R_1$ and $R_2$ correspond to a Gaussian weather signal and white noise as shown therein as produced on a simulator. W is the spectrum width and V' the mean velocity, both for the normalized Nyquist interval on [−1 to 1]. The time series of I and Q and the corresponding Doppler power spectrum are shown. The Doppler spectrum displays the radial velocity on the X-axis over the unambiguous range or Nyquist interval and the power in dB relative to saturation on the Y-axis. For illustration, FIG. 4 is based on 256 time series points (one point per pulse), which yields 256 spectrum components. In actual operation, less spectrum components would typically be processed. The resulting spectrum shows the three major components of the Doppler spectrum: white noise; ground clutter at zero radial velocity; and a spectrum of weather targets having a Gaussian shape characterized by the weather power, mean velocity and width (standard deviation), i.e., the spectrum moments.

The autocorrelation lags above and the corresponding physical models have five unknowns: N, S, C, V', W. Because the $R_1$ and $R_2$ lags are complex, this yields, effectively, five equations in five unknowns using the constraint provided by the argument of $R_1$. This closed system of equations can be solved for the unknowns which is the basis for calculating the moments from the autocorrelations. It can be seen that the system 100 computes the autocorrelations functions directly from the time series as shown above, or by taking the inverse DFT of the power spectrum. In one embodiment, this latter approach (a result of the Wiener Kintchine Theorem) is used in the system 100 in the Gaussian model adaptive processing (GMAP) algorithm calculations.

Gaussian Model Adaptive Processing

The system 100 preferably employs GMAP to adapt the width in the frequency domain to adjust for the effects of PRF. If there is no clutter present, then the system does little or no filtering. Further, the system repairs damage to overlapped (e.g., near zero velocity) weather targets and the DFT window is determined automatically to be the least aggressive possible to remove the clutter. By selecting a minimally aggressive DFT window, the variance of the moment estimates is reduced.

The system 100 uses several assumptions about the model for clutter, weather and noise. In one embodiment, the spectrum width of the weather signal is assumed to be greater than that of the clutter, this is a typical assumption of Doppler clutter filters. The Doppler spectrum is also assumed to consist of ground clutter, a single weather target and noise. The width of the clutter is also assumed to be approximately known. By reviewing the scan speed and to a lesser extent by the climatology of the local clutter targets, the width of the clutter can be approximated. The assumed width of the clutter is used to determine how many interior clutter points are removed. The shape of the clutter is also assumed to be approximately Gaussian. The Gaussian shape of the clutter is also used to calculate how many interior clutter points are removed. The shape of the weather is also assumed to be approximately Gaussian. The Gaussian shape of the weather is used to reconstruct filtered points in overlapped weather.

Figure 7:
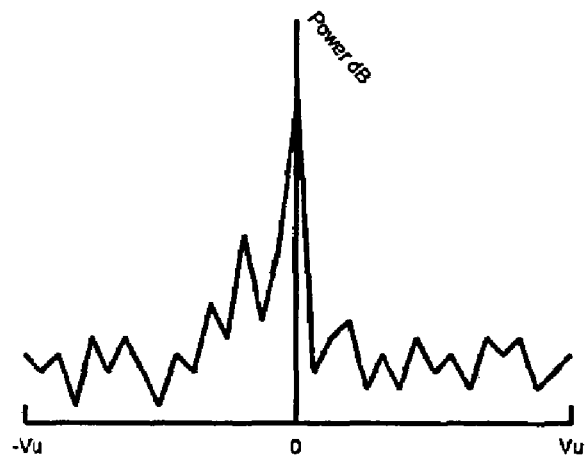
FIG. 7 illustrates a graph of a Doppler power spectrum.

Referring now to FIGS. 7-10, a series of steps used to implement GMAP are shown schematically. Referring in particular to FIG. 7, i.e., step one, the system 100 applies a window and DFT to the input time series to obtain the Doppler power spectrum. In a preferred embodiment, a Hamming window is used for the first trial. The Hamming window weighting function is applied to the IQ values and a DFT is then performed to provide good spectrum resolution. Note that if the requested number of samples is exactly a power of 2, then the system 100 uses a FFT.

When there is no or very little clutter, use of a rectangular weighting function leads to the lowest-variance estimates of intensity, mean velocity and spectrum width. When there is a very large amount of clutter, then the aggressive Blackman window is required to reduce the "spill-over" of power from the clutter target into the sidelobes of the impulse response function. The Hamming window is used as the first attempt. After the first pass is complete, the system 100 decides either accept the Hamming results, or recalculate for either rectangular or Blackman depending on the clutter-to-signal ratio (CSR) computed from the Hamming analysis. The recalculated results are then checked to determine whether to use these or the original Hamming result as described further below with respect to FIG. 10.

Figure 8:
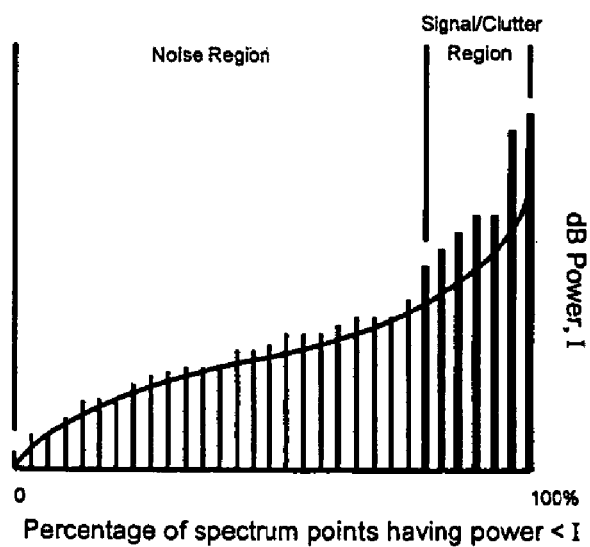
FIG. 8 illustrates the spectrum components in ascending order of itensity.
Figure 9:
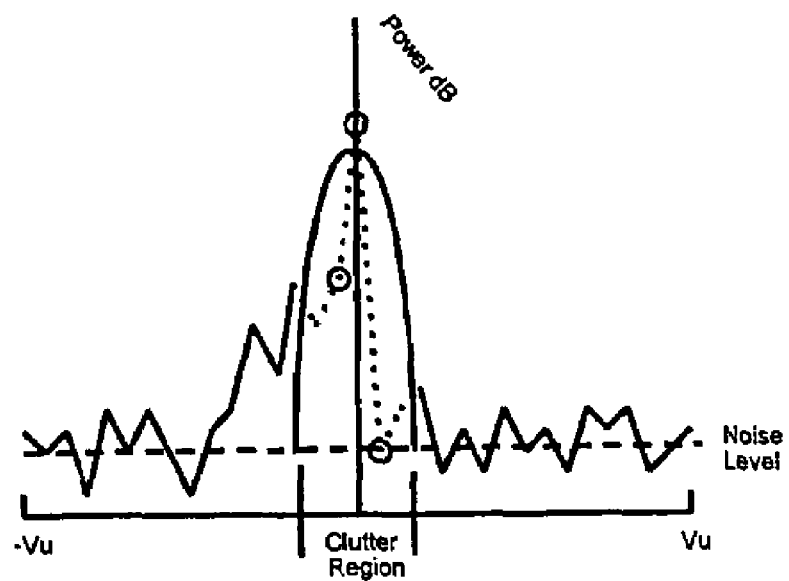
FIG. 9 illustrates a Gaussian shape being fit to three central spectrum points.

Referring in particular to FIG. 8, the system 100 determines the noise power if the noise level is not known or if GMAP is recalculated using the Blackman window for CSR>40 dB. In general, the spectrum noise power is known from periodic noise power measurements. Since the digital IF receiver 116 is linear and requires no receiver gain control, the noise power is well-behaved at all ranges. The time that the spectrum noise power differs from the measured noise power is for very strong clutter targets. In this case, the clutter contributes power to all frequencies, essentially increasing the spectrum noise level. The increased spectrum noise level primarily occurs for two reasons: 1) In the presence of very strong clutter, even a small amount of phase noise causes the spectrum noise level to increase; and 2) There is significant power that occurs in the window side-lobes. For a Hamming window, the window side lobes are down by 40 dB from the peak at zero velocity. Thus 50 dB clutter targets have spectrum noise that is dominated by the window sidelobes in the Hamming case. The more aggressive Blackman window has approximately 55 dB window sidelobes at the expense of having a wider impulse response and larger negative effect on the variance of the estimates.

When the noise power is not known, the system 100 may optionally compute the noise power using a dynamic approach. The Doppler spectrum components are first sorted in order of their power as shown in FIG. 8. The sorting places the weakest component on the left and the strongest component on the right. The vertical axis is the power of the component. The horizontal axis is the percentage of components that have power less than the y-axis power value. Plotted on a dB scale, Poisson distributed noise has a distinct shape, as shown by the curved line 150. The curved line 150 shows a strong singularity at the left associated with taking the log of numbers near zero, and a strong maximum at the right where there is always a finite probability that a few components will have extremely large values.

Still referring to FIG. 8, there are generally two regions: a noise region on the left (weaker power) and a signal/clutter region on the right (stronger power). The noise level and the transition between these two regions is determined by first summing the power in the range 5% to 40%. This sum is used to determine the noise level by comparing with the sum value corresponding to the theoretical curve. Next, the power is summed beyond the 40% point for both the actual and theoretical rank spectra. The point where the actual power sum exceeds the theoretical value by 2 dB determines the boundary between the noise region and the signal/clutter region. As a result, the system generates two outputs: a spectrum noise level; and a list of components that are either signal or clutter Referring now in particular to FIG. 9, the system 100 removes the clutter points. The total power of the three central spectrum points 152 is used to fit a Gaussian curve having a nominal spectrum based on the number of spectrum samples, PRF and wavelength. The dashed line 154 indicates the points within the intersection of the Gaussian curve and noise level to be discarded. In more detail, the inputs for removing the clutter points are the Doppler power spectrum, the assumed clutter width in m/s and the noise level, either known from noise measurement or optionally calculated from the previous step, Initially, the power in the three central spectrum components is summed (e.g., DC +/−1 component) and compared to the power that would be in the three central components of a normalized Gaussian spectrum having the specified clutter width and discretized in the identical manner. The comparision serves as a basis for normalizing the power in the Gaussian curve to the observed power. The Gaussian curve is extended down to the noise level and all spectral components that fall within the Gaussian curve are removed. The power in the components that are removed is the "clutter power".

It is noted that the system 100 uses the three central points to do the power normalization of the actual versus the idealized spectrum of clutter. Such a calculation is more robust than using a single point since for some realizations of clutter targets viewed with a scanning antenna, the DC component is not necessarily the maximum. Averaging over the three central components is a more robust way to characterize the clutter power. The system 100 is designed to eliminate the proper number of central points so that the operator only has to specify a nominal clutter width in m/s. In other words, the system 100 automatically accounts for the PRF, wavelength or number of spectrum points without operator intervention.

In the event that the sum of the three central components is less than the corresponding noise power, then the system 100 assumes that there is no clutter and all of the moments are then calculated using a rectangular window. If the power in the three central components is only slightly larger than the noise level, then the computed width for clutter removal will be so narrow that only the central (DC) point shall be removed. As a result, if there is no clutter then, the system 100 does nothing or, possibly, removes the central component. Therefore, there is no need to do a clutter bypass map, i.e., turn-off the clutter filter at specific ranges, azimuths and elevation for which the map declares that there is no clutter. Because of the day-to-day variations in the clutter and the presence of AP, the clutter map is often incorrect. Since the system 100 uses GMAP to determine the no-filter case automatically and then processes accordingly, a clutter map is not required.

Figure 10:
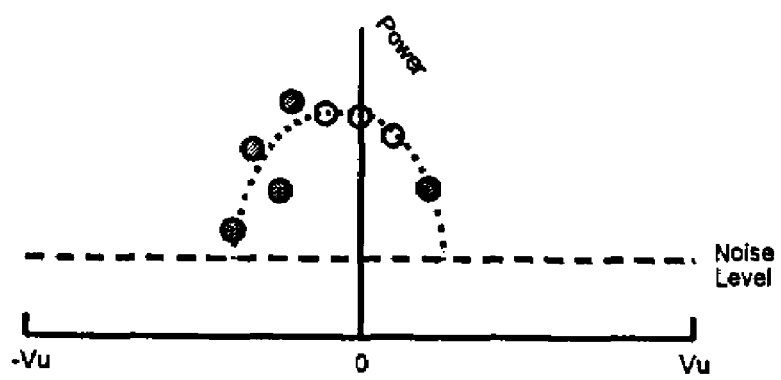
FIG. 10 illustrates a Gaussian shape being refit to the remaining weather spectrum points after several interations upon the data represented in FIG. 9.

Referring now in particular to FIG. 10, the system 100 replaces clutter points depending on how the noise level is determined i.e., the dynamic noise case and the fixed noise level case. For the dynamic noise level case, the system 100 has determined which spectrum components are noise and which spectrum components are clutter. Presumably, the remaining signal is weather signal. An inverse DFT using only these components is performed to obtain the autocorrelation at lags 0, 1. With only a few remaining points and only the first two lags being calculated, the system 100 is very computationally efficient. The pulse pair mean velocity and spectrum width are calculated using the Gaussian model. It is noted that since the noise has already been removed, there is no need to do a noise correction. The Gaussian model is then applied using the calculated moments to determine a substitution value for each of the spectrum components that were previously removed.

In the overlapped weather as shown in FIGS. 7-10, the first estimate of the replacement power is typically too small. For this reason, the system 100 re-computes R0 and R1 using both the observed and the replacement points and computes new replacement points. The recomputation of R0 and R1 is done iteratively until the power difference between two successive iterations is less than 0.2 dB and the velocity difference is less than 0.5% of the Nyquist interval. For the fixed noise case, the calculation is similar except the spectrum points that are larger than the noise level are used. In short, the Gaussian weather model is used to repair the filter bias, i.e., the damage that is caused by removing the clutter points.

Still referring to FIGS. 7-10, the system 100 checks for usage of the appropriate window and recalculates the moments if necessary. The clutter power is known from the spectrum components that were removed. Since the weather spectrum moments and the noise are also known, the CSR is calculated. The value of the CSR is used to decide whether the Hamming window is the most appropriate. In one embodiment, to determine if the optimal window was used based on the CSR the following logic is applied: if the CSR>40 dB, the system 100 repeats step 210 using a Blackman window and dynamic noise calculation; if the CSR>20 dB, the system 100 repeats using a Blackman window and if the CSR>25 dB, the Blackman window results are used; if the CSR<2.5 dB, the system 100 repeats using a rectangular window, then if the CSR<1 dB, the rectangular window results are used; otherwise the system 100 accepts the hamming window results. As a result, the system 100 process to a final weather signal in which very weak clutter is processed using a rectangular window, moderate clutter a Hamming window, while severe clutter requires a Blackman window. It is envisioned that if no clutter were removed, then the spectrum is processed with a rectangular window and the least aggressive window is used for the calculation of the spectrum moments, resulting in the minimum variance of the moment estimates.

Figure 11:
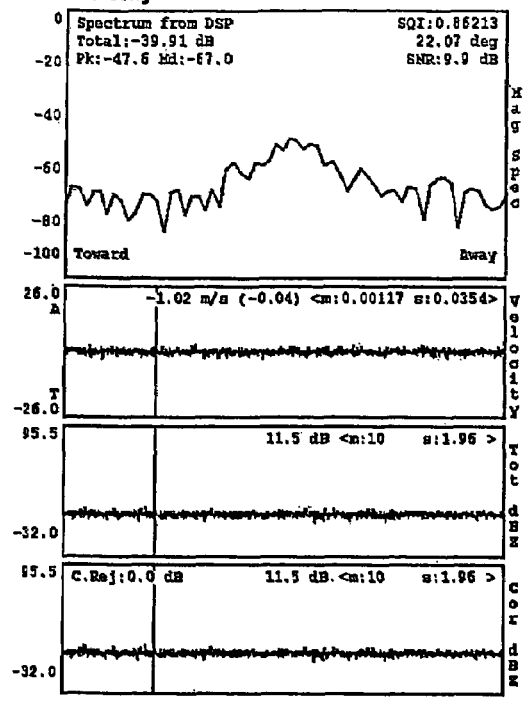
FIG. 11 shows an example of simulations for the case when the weather has zero velocity.
Figure 11:
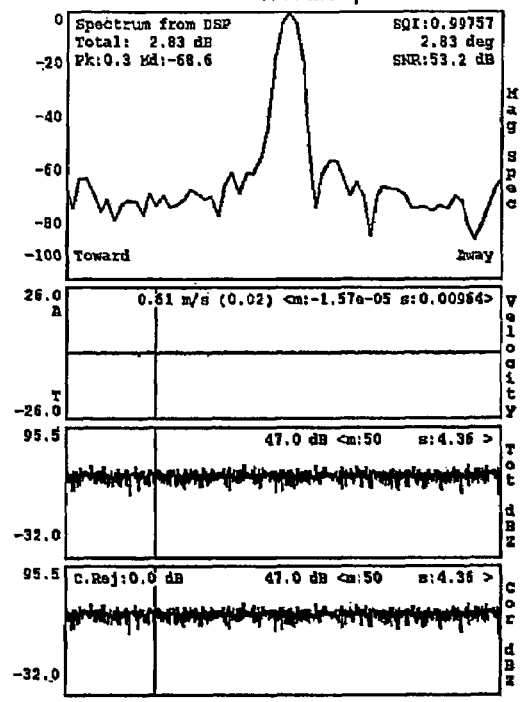
Figure 11:
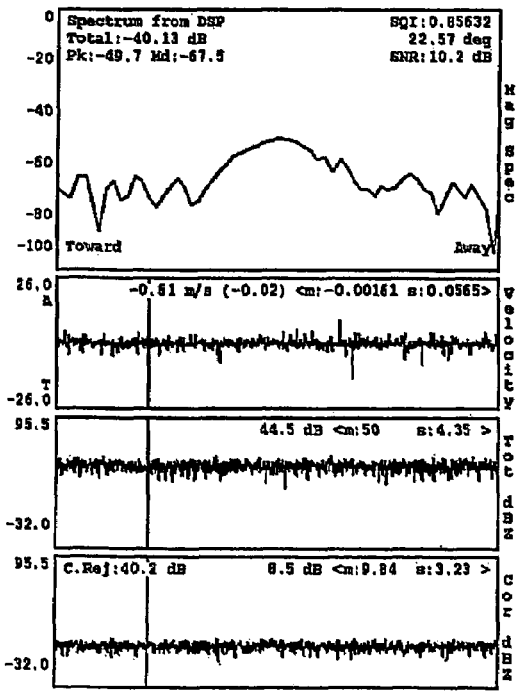

Referring now to FIG. 11, an example of simulations for the case when the weather has zero velocity, i.e., the weather signal is perfectly overlapped with clutter, is shown. The upper left graph shows the weather signal with −40 dB power without any clutter and without any filtering. The graph at the tipper right shows the same spectrum with 0 dB of clutter power added for a clutter width of 0.012 (0.3 m/s at S band, 1000 Hz PRF), This is a CSR of 40 dB. The panel at the lower left shows the weather signal after filtering according to the subject technology. In each of the moment plots, there are several values that are displayed. The left-most number shows the value at the range cursor which is positioned as indicated by the vertical line. To the right, the "in" value is the mean and the "s" value the standard deviation as averaged over all range bins (1000 in this example). For velocity, these are in normalized units expressed as a fraction of the Nyquist interval. For reflectivity the values are in dB.

The mean velocity is correctly recovered as expected (the "m" value in the plot), but the standard deviation is higher (0.06 vs 0.04 in normalized units). The "Cor dBZ" shows 40.2 dB of "C.Rej". This is the difference between the "Tot dBZ" and the "Cor dBZ" values. The expected value is 40 dB in this case. This indicates that the system 100 has recovered the weather signal in spite of the aggressive clutter filtering that is required. The standard deviation of the "Tot dBZ" is greater in the weather plus clutter (4.35 normalized units) as compared to the weather—only case. This is caused by the fluctuations in the clutter power in the Gaussian clutter model, The standard deviation of the Cor dBZ after GMAP filtering, while not as low as for the weather—only case are lower than the weather plus clutter case. In other words, the system 100 processing removes some of the high variance in the dBZ estimates that is caused by clutter, but is not quite as good as doing nothing. While the invention has been described with respect to embodiments, one skilled in the art will appreciate that various changes or modifications are possible without departing from the spirit/scope of the invention as defined by the appended claims.

What is claimed is:

1. A system for processing a radar signal comprising:
    (a) a memory storing software and echo data related to a transmitted pulse, wherein the echo data includes an input time series; and
    (b) a processor for running the software, the processor being in communication with the memory, wherein the processor is operative to:
        (i) apply a window to the input time series;
        (ii) apply a discrete Fourier transform to the windowed input time series to obtain a Doppler power spectrum;
        (iii) filter the Doppler power spectrum to remove clutter points; and
        (iv) perform an iterative interpolation using a Gaussian model to replace the artifacts that are removed by filtering the Doppler power spectrum.

2. A system as recited in claim 1, wherein the processor is further operative to select and apply a window based upon clutter in the echo data.

3. A system as recited in claim 1, wherein the processor is further operative to set a gain of the window to preserve total power.

4. A system as recited in claim 1, wherein the processor is further operative to output moments of the Doppler power spectrum to an application processor, which generates a display for meteorological interpretation.

5. A system as recited in claim 4, wherein the moments are intensity, mean radial velocity and spectrum width of weather targets in a beam for each range increment.

6. A system as recited in claim 1, wherein the processor is further operative to apply a FFT approach when a number of samples is a power of two.

7. A system as recited in claim 1, wherein the window is an aggressive low side-lobe window.

8. A system as recited in claim 7, wherein the processor is further operative to automatically adjust a width of a clutter filter based on radar wavelength, pulse repetition frequency, number of pulse samples and strength of the clutter.

9. A system as recited in claim 1, wherein the processor is further operative to calculate an autocorrelation at lag zero without clutter filtering, the autocorrelation being computed by taking an inverse DFT of the Doppler power spectrum in a frequency domain.

10. A system as recited in claim 1, wherein the artifacts are selected from the group consisting of ground clutter, aircraft, interference from other radars, and known physical structures.

11. A method for processing data generated by a radar system comprising the steps of:
    (a) applying a first guess weighting function to input time series data and then applying a discrete Fourier transform (D FT) to the windowed input time series data to generate a Doppler power spectrum;
    (b) determining and removing an optimal number of clutter points based on a Gaussian model of clutter, an assumed clutter width and a measured receiver noise power;
    (c) calculating moments and using the moments to fit a Gaussian function to remaining weather points to make a next guess Doppler spectrum;
    (d) recalculating the moments based on the next guess Doppler spectrum;
    (e) determining if the recalculated moments obtained in step (d) based on the next guess Doppler power spectrum are acceptably close to the moments calculated by in step (c) by comparison of differences between the moments to a user-defined tolerance;
    (f) if the differences between the moments of the Doppler power spectrum are not acceptable, recalculating the moments of the Doppler power spectrum based on moment estimates and repeating steps (c), (d) and (e) until the next guess and previous guess of the moments agree to within the user-defined tolerance; and
    (g) checking for usage of an appropriate window and noise power value and recalculating the moments by repeating steps (a)-(f), wherein the appropriate window is determined according to the following:
        i) if a clutter-to-signal ratio (CSR)>a first adjustable parameter, the first adjustable parameter typically being about 40 dB, using a Blackman window and dynamic noise calculation and using results thereof for the moments of step (d); and
        ii) if the CSR>a second adjustable parameter, the second adjustable parameter typically being about 20 dB, using a Blackman window, then if CSR>25 dB using the Blackman results for the moments of step (d); and
        iii) if the CSR<a third adjustable parameter, the third adjustable parameter typically being about 2.5 dB, using a rectangular window, then if the CSR<a fourth adjustable parameter, the fourth adjustable parameter typically being about 1 dB, using the rectangular window; otherwise
        if i), ii) and iii) do not occur, using the results of the first guess weighting function.

12. A method as recited in claim 11, wherein the first guess weighting function is a Hamming window.

13. A method as recited in claim 11, further comprising the step of performing an inverse DFT to obtain an autocorrelation at lags 0, 1 and applying a Gaussian model using the calculated moments to determine a substitution value for each of the clutter points that were removed.

14. A method as recited in claim 13, wherein the clutter points are removed by fitting a Gaussian curve to three central spectrum points of the Doppler power spectrum and discarding points within an intersection of the Gaussian curve and a noise level.

15. A method as recited in claim 14, wherein the Gaussian curve has a nominal spectrum based on the number of spectrum samples, PRF and wavelength.

16. A method as recited in claim 11, wherein removal of the clutter points is based on the Doppler power spectrum, assumed clutter width and the noise level, and the noise level is known from noise measurement.

17. A method as recited in claim 11, wherein if a sum of three central components is less than a noise power for the Doppler power spectrum, then all of the moments are calculated using a rectangular window and if the sum is only slightly larger than the noise level, then only a most central component is removed.

18. A method as recited in claim 17, when the clutter power is very strong, further comprising the step of computing the noise power using a dynamic approach of sorting the Doppler spectrum components in order of power to define two regions: a noise region; and a signal/clutter region, wherein the noise level and a transition between the two regions is determined by first summing a power in a range of 5% to 40%, the power is used to determine a boundary noise level by comparing with the power corresponding to a theoretical curve, then, the power is summed beyond the 40% point for both an actual and a theoretical rank spectra, at a point where the actual power sum exceeds the theoretical value by 2 dB determines a boundary between the noise region and the signal/clutter region to generate two outputs: a spectrum noise level; and a list of components that are either signal or clutter.

19. A processor for a weather radar system comprising:
memory for storing data and instructional code;
a processor in communication with the memory for accessing the data and executing the instructional code a software module stored in the memory and including instructions for the processor to execute the following steps of:
 i) applying a window weighting function to I and Q values to remove ground clutter prior to generating a Doppler power spectrum;
 ii) generating the Doppler power spectrum;
 iii) performing a discrete Fourier transform on the Doppler power spectrum;
 iv) determining a noise power in order to determine clutter points;
 v) removing the clutter points; and
 vi) replacing the clutter points with signal components to create the resulting Doppler power spectrum.

20. A processor as recited in claim 19, wherein the module is further operative to iterate through steps iv) through vi).

21. A system as recited in claim 1, wherein the window is a rectangular window.

22. A method as recited in claim 11, wherein the user-defined tolerance is less than 0.2 dB.

* * * * *